United States Patent
Bolyard, Jr.

(10) Patent No.: US 7,857,173 B2
(45) Date of Patent: Dec. 28, 2010

(54) SOLENOID CONTROL VALVE WITH QUICK-CONNECT FITTINGS FOR MATING WITH AN ADHESIVE CONTROL MODULE ASSEMBLY OF A HOT MELT ADHESIVE DISPENSING SYSTEM

(75) Inventor: Edward W. Bolyard, Jr., Old Hickory, TN (US)

(73) Assignee: Illinois Tool Works Inc., Glenview, IL (US)

( * ) Notice: Subject to any disclaimer, the term of this patent is extended or adjusted under 35 U.S.C. 154(b) by 1061 days.

(21) Appl. No.: 11/482,952

(22) Filed: Jul. 10, 2006

(65) Prior Publication Data
US 2008/0006658 A1    Jan. 10, 2008

(51) Int. Cl.
B05C 5/02    (2006.01)

(52) U.S. Cl. .................... 222/504; 222/146.5; 222/309; 137/625.43; 137/884; 285/305

(58) Field of Classification Search ................. 222/504, 222/330, 146.5, 1, 189.06, 309; 137/625.43, 137/884; 285/305, 124.5, 124.4; 239/298, 239/135
See application file for complete search history.

(56) References Cited

U.S. PATENT DOCUMENTS

| | | | |
|---|---|---|---|
| 4,887,850 A * | 12/1989 | Albrecht | 285/124.4 |
| 5,222,524 A | 6/1993 | Sekler et al. | |
| 5,407,101 A * | 4/1995 | Hubbard | 222/146.5 |
| 5,887,768 A * | 3/1999 | Price et al. | 222/571 |
| 5,950,875 A * | 9/1999 | Lee et al. | 222/145.5 |
| 6,089,413 A | 7/2000 | Riney et al. | |
| 6,171,089 B1 | 1/2001 | Oehman, Jr. | |
| 6,361,019 B1 | 3/2002 | Massey | |
| 6,386,229 B1 | 5/2002 | Morikawa et al. | |
| 6,406,625 B1 * | 6/2002 | Brock et al. | 210/232 |
| 6,422,428 B1 | 7/2002 | Allen et al. | |
| 6,425,416 B1 * | 7/2002 | Narita et al. | 137/625.27 |
| 6,688,498 B1 | 2/2004 | McGuffey | |
| 6,832,788 B2 * | 12/2004 | Fukano et al. | 285/124.5 |
| 7,214,885 B2 * | 5/2007 | Byerly | 174/135 |
| 7,316,244 B2 | 1/2008 | Miyazoe et al. | |
| 7,370,674 B2 * | 5/2008 | Doyle | 137/884 |
| 2004/0099752 A1 | 5/2004 | Boger | |
| 2005/0224513 A1 * | 10/2005 | Strong et al. | 222/1 |

FOREIGN PATENT DOCUMENTS

| | | |
|---|---|---|
| DE | 2915391 | 10/1980 |
| EP | 1024324 | 1/2000 |
| EP | 1652588 | 5/2006 |
| GB | 933205 | 8/1963 |

* cited by examiner

Primary Examiner—J. Casimer Jacyna
(74) Attorney, Agent, or Firm—Law Offices of Steven W. Weinrieb

(57) ABSTRACT

A new and improved hot melt adhesive dispensing system comprises a new and improved solenoid control valve assembly and a new and improved adhesive control module assembly. The solenoid control valve assembly is mounted directly upon the adhesive control module assembly by quick-connect fittings, and control air flow paths are defined within the solenoid control valve assembly and within the adhesive control module assembly so as to effectively comprise substantially short, linear fluid flow paths which will thereby minimize the lengths of the control air flow paths and therefore, in turn, minimize the cycling response time of the nozzle dispensing valve member of the adhesive control module assembly.

8 Claims, 3 Drawing Sheets

SOLENOID CONTROL VALVE WITH QUICK-CONNECT FITTINGS FOR MATING WITH AN ADHESIVE CONTROL MODULE ASSEMBLY OF A HOT MELT ADHESIVE DISPENSING SYSTEM

FIELD OF THE INVENTION

The present invention relates generally to hot melt adhesive material dispensing systems, and more particularly to a new and improved hot melt adhesive dispensing system comprising a new and improved solenoid control valve assembly, for use in connection with an adhesive control module assembly, in order to appropriately route the control air used to actuate the piston member, integrally connected to the nozzle dispensing valve of the adhesive control module assembly, so as to move the nozzle dispensing valve between its OPENED, unseated position and its CLOSED, seated position, wherein the new and improved solenoid control valve assembly can be mounted directly upon the adhesive control module assembly, wherein the incoming and outgoing control air flow paths can be defined within the solenoid control valve assembly and within fittings thereof, which are adapted to mate with bores defined within the adhesive control module assembly, so as to effectively comprise substantially short, linear fluid flow paths between the solenoid control valve assembly and the adhesive control module assembly which will thereby minimize the lengths of the control air flow paths extending between the solenoid control valve assembly and the adhesive control module assembly, and wherein further, the fittings of the solenoid control valve assembly comprise quick-connect fittings such that the removal and replacement of the solenoid control valve assembly from and upon the adhesive control module assembly can be performed in accordance with relatively easy and rapid procedures.

BACKGROUND OF THE INVENTION

Hot melt adhesive material dispensing systems must be operated intermittently in order to, for example, only deposit the hot melt adhesive material upon predetermined regions of substrates, at predetermined times, so as not to cause operational problems or to result in undesirable product characteristics, and concomitantly, to control the flow of the hot melt adhesive material during those periods of time when the hot melt adhesive material is not actually being dispensed. Adhesive control module assemblies, having suitable nozzle dispensing valve assemblies incorporated therein, are conventionally used to effectively control the starting and stopping of the flow of the hot melt adhesive material to the dispensing nozzle and its associated discharge orifice. The nozzle dispensing valve assemblies each comprise a forwardly disposed nozzle dispensing valve member, a valve stem, and a piston member integrally mounted upon a rearward portion of the valve stem for disposition within an air cylinder chamber. Accordingly, when control air is selectively supplied into the opposite ends of the air cylinder chamber, the piston member will be appropriately actuated or moved so as to, in turn, appropriately actuate or move the nozzle dispensing valve between its OPENED, unseated position and its CLOSED, seated position in order to control the intermittent dispensing of the hot melt adhesive material. Still yet further, solenoid control valve assemblies are operatively associated with the adhesive control module assemblies for controlling the routing of the control air into and out of the air cylinder chamber in order to, in fact, control the movements of the piston member within the air cylinder chamber.

In accordance with one conventional type of system, the solenoid control valve assemblies are operatively connected to the adhesive control module assemblies by means of suitable fittings and connecting tubes. The connecting tubes effectively reduce the amount of heat that tends to be transferred from the adhesive control module assemblies to the solenoid control valve assemblies, which results in enhancing the service life of the solenoid control valve assemblies, however, the operative connection of the solenoid control valve assemblies to the adhesive control module assemblies by means of the connecting tubes also increases the length of the fluid path through which the control air must travel between the solenoid control valve assemblies and the adhesive control module assemblies. Accordingly, the actuation, cycling, or response times, attendant the switchover operations effectuated by means of the solenoid control valve assemblies, are relatively slow. In order to rectify the operative deficiencies of the aforenoted conventional type of hot melt adhesive material control system, a second conventional type of system was developed, as is illustrated within FIG. 1, wherein the solenoid control valve assembly is adapted to be mounted upon the adhesive control module assembly thereby eliminating the need for the connecting tubes.

More particularly, as can be appreciated from FIG. 1, an adhesive control module assembly is disclosed at 12 and is disposed atop a dispensing nozzle assembly 14. A solenoid control valve assembly 16 is disposed above the adhesive control module assembly 12, and an adapter 18 is interposed between the solenoid control valve assembly 16 and the adhesive control module assembly 12. A first heat isolator 20 is interposed between the upper surface portion of the adaptor 18 and the undersurface portion of the solenoid control valve assembly 16, and a second heat isolator 22 is interposed between the upper surface portion of the adhesive control module assembly 12 and the undersurface portion of the adaptor 18. Still yet further, an inlet or supply port 24 for supplying control air to the solenoid control valve assembly 16 is provided within a first side wall portion of the adaptor 18, while an outlet or exhaust port 26 for exhausting the control air from the solenoid control valve assembly 16 is provided within a second oppositely disposed side wall portion of the adaptor 18. Accordingly, it can be appreciated that the control air is conducted into the adaptor 18 by means of the inlet or supply port 24, routed upwardly into the solenoid control valve assembly 16 so that the solenoid control valve assembly 16 can properly route the control air downwardly through the adaptor 18 to the appropriate side of the piston member of the nozzle dispensing valve assembly disposed within in the adhesive control module assembly 12 in order to appropriately move the piston member and thereby control the disposition of the nozzle dispensing valve member of the adhesive control module assembly 12, and concomitantly therewith, the air, disposed upon the opposite side of the piston member of the nozzle dispensing valve assembly can be routed upwardly through the adaptor 18, into the solenoid control valve assembly 16, and back down into the adaptor 18 for discharge outwardly through or from the outlet or exhaust port 26. It can therefore be appreciated that while the solenoid control valve assembly 16 is mounted upon the adhesive control module assembly 12 without the use of interconnecting tubes, it is nevertheless seen, and to be appreciated, that the fluid flow pathway for the control air is quite circuitous and therefore still relatively long whereby, again, the actuation, cycling, or response times attendant the switchover operations effectuated by means of the solenoid control valve assembly 16, will still be relatively slow. In addition, the definition or formation of the various fluid passageways within the adhesive control module assembly 12 and within the solenoid control valve assembly 16 are relatively complex so as to require extensive machining operations.

A need therefore exists in the art for a new and improved hot melt adhesive material dispensing system comprising a new and improved solenoid control valve assembly, for use in connection with an adhesive control module assembly, wherein the new and improved solenoid control valve assembly is to be directly mounted upon the adhesive control module assembly so as to eliminate the connecting tubes between the solenoid control valve assembly and the adhesive control module assembly, wherein the incoming and outgoing control air flow paths can be defined within the solenoid control valve assembly, and within fittings thereof which are adapted to mate with bores defined within the adhesive control module assembly, so as to effectively comprise substantially short linear fluid flow paths between the solenoid control valve assembly and the adhesive control module assembly in order to thereby minimize the lengths of the control air flow paths extending between the solenoid control valve assembly and the adhesive control module assembly, and wherein further, the fittings of the solenoid control valve assembly can enable the quick and easy removal and replacement of the solenoid control valve assembly from and upon the adhesive control module assembly.

SUMMARY OF THE INVENTION

The foregoing and other objectives are achieved in accordance with the teachings and principles of the present invention through the provision of a new and improved hot melt adhesive material dispensing system comprising a new and improved solenoid control valve assembly, for use in connection with a new and improved adhesive control module assembly, in order to control the incoming air used to actuate the piston member, integrally connected to the nozzle dispensing valve of the adhesive control module assembly, so as to respectively move the nozzle dispensing valve between its OPENED, unseated position and its CLOSED, seated position and thereby control the dispensing of the hot melt adhesive material in accordance with various different predetermined hot melt adhesive dispensing patterns. The new and improved solenoid control valve has a pair of INLET and EXHAUST ports defined within a first end wall thereof, and a pair of quick-connect tubular fittings fixedly mounted upon a second, oppositely disposed end wall thereof for mated engagement with fluid bores defined within the adhesive control module assembly. In this manner, the fluid flow paths for the incoming control air comprise substantially short, linear flow paths which can be used to quickly actuate or move the piston member of the nozzle dispensing valve so as to, in turn, actuate or move the nozzle dispensing valve between its OPENED, unseated position and its CLOSED, seated position in accordance with particular hot melt dispensing modes of operation and in accordance with relatively rapid actuation, response, and cycling times. In addition, the quick-connect tubular fittings not only define the fluid flow paths between the solenoid control valve assembly and the adhesive control module assembly, but in addition, enable the solenoid control valve assembly to be removed from the adhesive control module assembly and replaced by means of a new solenoid control valve assembly in a relatively easy and rapid manner than possible with conventional threaded fittings.

BRIEF DESCRIPTION OF THE DRAWINGS

Various other features and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE PREFERRED EMBODIMENT

Figure 1:
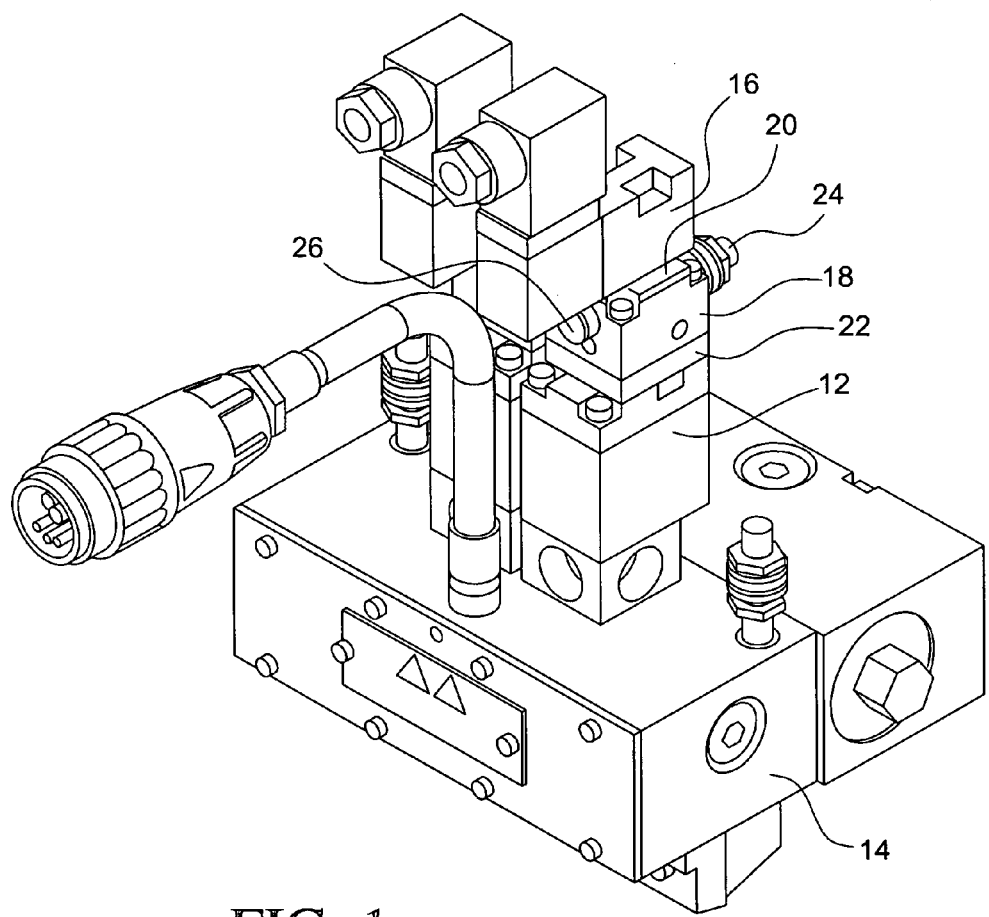
FIG. 1 is perspective view of a conventional, PRIOR ART hot melt adhesive material dispensing assembly wherein the solenoid control valve assembly is mounted atop the adhesive control module assembly through means of an adaptor, and wherein further, the inlet supply and outlet exhaust ports are defined within the adaptor.
Figure 2:
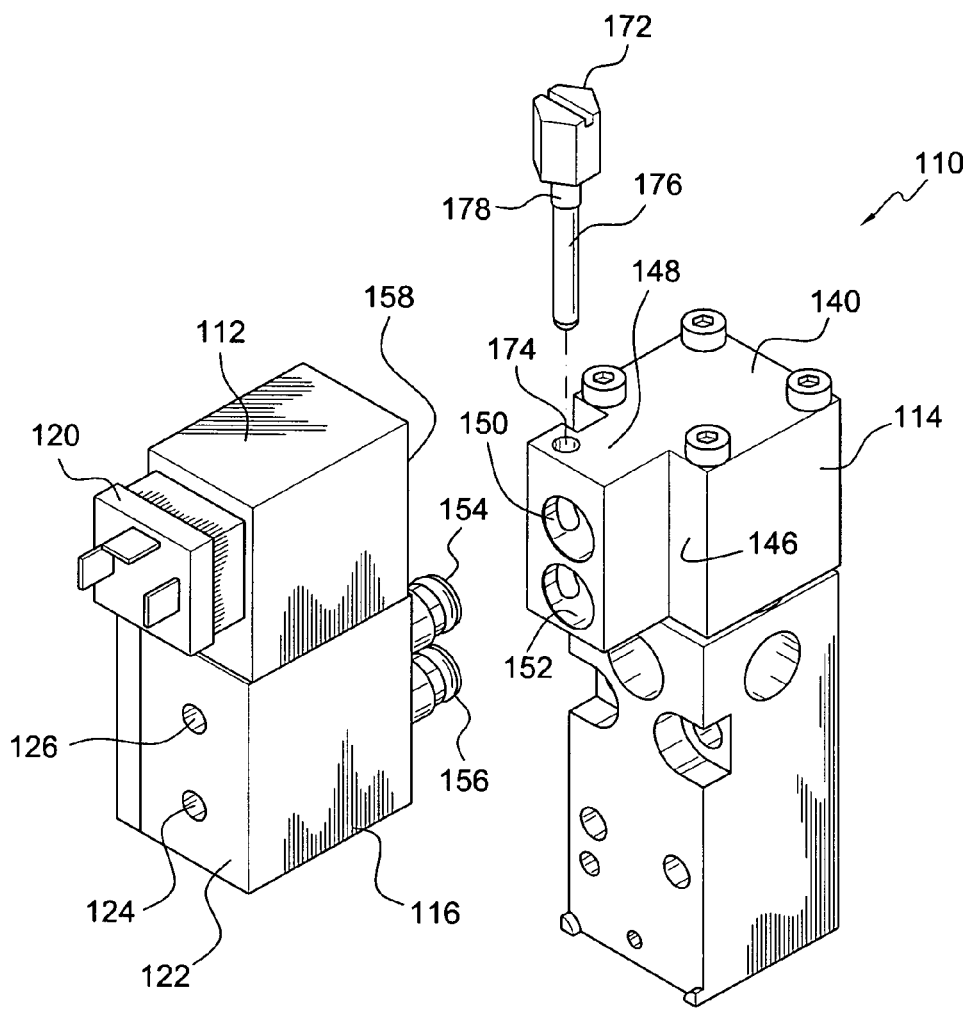
FIG. 2 is a perspective, exploded view of a new and improved solenoid control valve assembly and a new and improved adhesive control module assembly, constructed in accordance with the principles and teachings of the present invention, wherein the solenoid control valve assembly is adapted to be mounted directly upon the adhesive control module assembly by means of a pair of quick-connect fittings mounted upon one side surface portion of the solenoid control valve assembly, and wherein further, the solenoid control valve assembly is provided with INLET and OUTLET control air ports, within an oppositely disposed side surface portion thereof, which are adapted to be fluidically connected to the quick-connect fittings in a substantially short, linear, flow-through manner.
Figure 3:
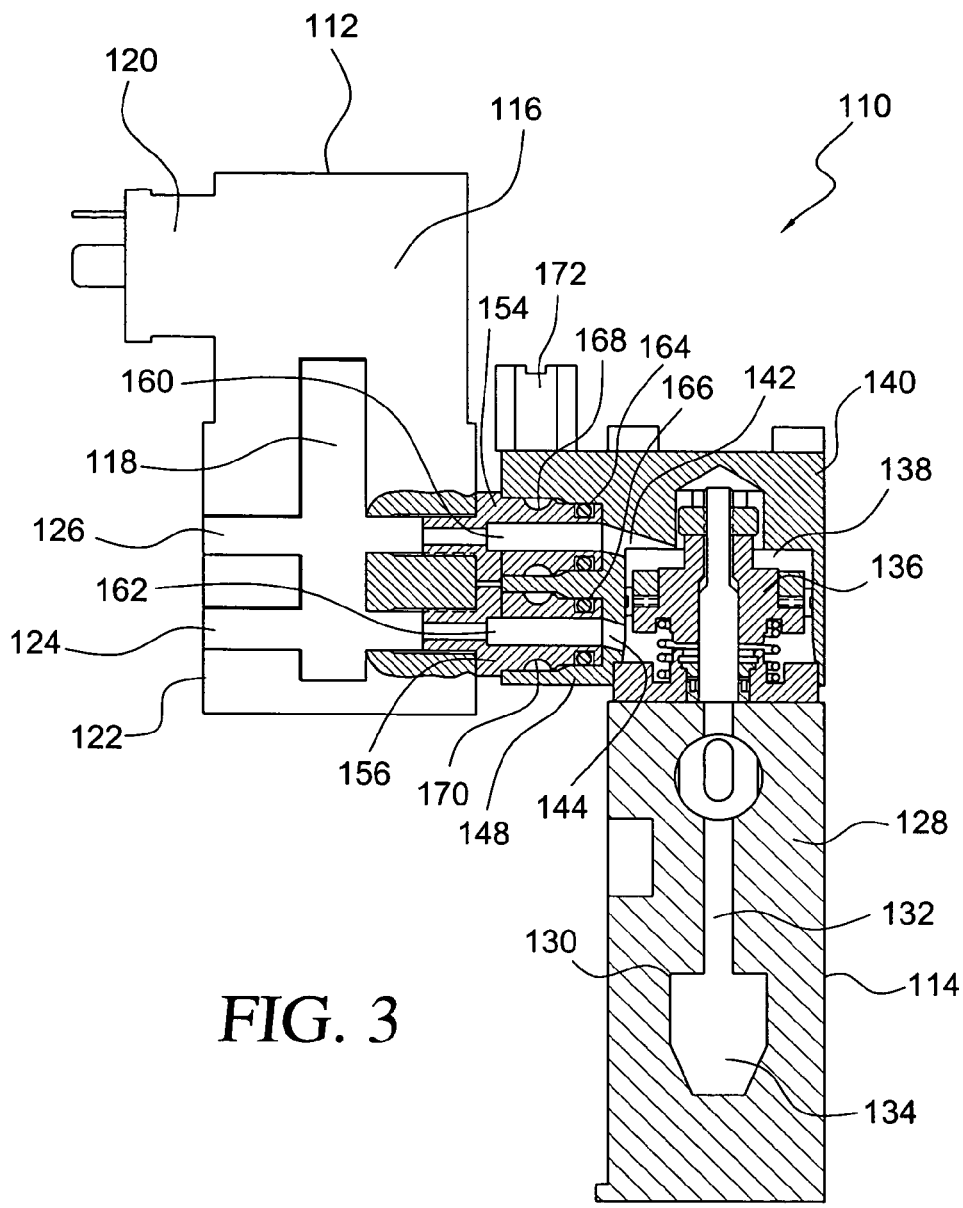
FIG. 3 is a side elevational view, partly in cross-section, of the new and improved solenoid control valve assembly and the new and improved adhesive control module assembly, as has been disclosed within FIG. 2, wherein the quick-connect fittings are disclosed as well as their mated connection to the adhesive control module assembly.

Referring now to the drawings, and more particularly to FIGS. 2 and 3 thereof, a new and improved hot melt adhesive material dispensing system, constructed in accordance with the principles and teachings of the present invention, is disclosed and is generally indicated by the reference character 110. More particularly, it is seen that the new and improved hot melt adhesive material dispensing system 110 comprises a new and improved solenoid control valve assembly 112 and a new and improved adhesive control module assembly 114. The solenoid control valve assembly 112 is seen to comprise a housing 116 which substantially has the configuration of a rectangular parallelepiped, wherein a solenoid control valve 118, which is only shown schematically, is disposed internally within the housing 116. An electrical connector 120 is fixedly mounted upon an upper portion of a first side wall 122 for providing electrical power to the solenoid control valve 118, and a pair of vertically spaced control air passages 124, 126 are defined within the first side wall 122 so as to extend inwardly into the housing 116 in order to fluidically mate with, and be controlled by, the solenoid control valve 118. Control air passage 124 serves to introduce incoming air, from a suitable air supply source, not shown, into the solenoid control valve assembly 112, while control air passage 126 serves to exhaust control air out from the solenoid control valve assembly 112. In a similar manner, the adhesive control module assembly 114 also comprises a housing 128 which substantially has the configuration of a rectangular parallelepiped, and within which there is movably disposed a nozzle dispensing valve assembly 130. The nozzle dispensing valve assembly 130 comprises an axially elongated valve stem 132, a nozzle dispensing valve member 134 integrally disposed upon a lower end portion of the valve stem 132, and a control piston 136 integrally disposed upon an upper end portion of the valve stem 132. The control piston 136 is disposed within an air control chamber 138 which is defined within a cylinder 140 that is formed within an upper end of the adhesive control module assembly housing 128, and a pair of vertically spaced air passageways 142,144 are defined within a side wall portion 146 of the cylinder 140 so as to respectively be in fluidic communication with upper and lower portions of the air control chamber 138 that are disposed above and below the control piston 136.

In addition, it is also seen that the cylinder 140 has an extension portion 148 projecting outwardly from the side wall portion 146, and a pair of vertically spaced counterbores 150,152 are defined within the outwardly projecting extension portion 148. Correspondingly, the solenoid control valve assembly 112 has a pair of tubular fittings 154,156 mounted upon, and projecting outwardly from, a second side wall portion 158 which is disposed opposite the first side wall portion 122 upon which the electrical connector 120 is mounted and within which the pair of air control passages 124,126 are defined, and as can best be seen from FIG. 3, the tubular fittings 154,156 have air passageways 160,162 respectively defined therein. The air passageways 160,162 defined within the tubular fittings 154,156 are respectively substantially coaxially aligned with the control air passages 124,126 defined within the solenoid control valve assembly housing 116 and are adapted to be fluidically connected to the control air passages 124,126 through means of the solenoid control valve 118. In a similar manner, the air passageways 160,162 defined within the tubular fittings 154,156 are adapted to be fluidically connected to the air passageways 142,144 defined within the side wall portion 146 of the cylinder 140 as a result of the tubular fittings 154,156 being respectively inserted within the counterbores 150,152 defined within the outwardly projecting extension portion 148 of the cylinder 140. O-ring seal members 164,166 are disposed upon the inner end portions of the tubular fittings 154,156 so as to effectively define fluidic seals between the tubular fittings 154,156 and the inner peripheral wall surfaces of the counterbores 150,152.

It is lastly noted that the tubular fittings 154, 156 comprise quick-connect fittings by means of which the entire solenoid control valve assembly 112 can be quickly and easily removed from the adhesive control module assembly 114 whereupon a similarly configured solenoid control valve assembly 112 can be quickly and easily mounted upon the adhesive control module assembly 114 so as to replace the original solenoid control valve assembly 112 when necessary. In order to fixedly mount the solenoid control valve assembly 112 upon the adhesive control module assembly 114, and in order to effectuate such a quick and easy removal of one solenoid control valve assembly 112 from the adhesive control module assembly 114 and the replacement of such solenoid control valve assembly 112 with another solenoid control valve assembly 112, an annular recess 168,170 is respectively defined within an external peripheral surface portion of each one of the tubular fittings 154,156. In addition, a vertically oriented headed retaining pin 172 is adapted to be inserted into a vertically oriented internally threaded bore 174 which is defined within the outwardly projecting extension portion 148 of the cylinder 140 so as to effectively intersect the counterbores 150,152 defined within the outwardly projecting extension portion 148 of the cylinder 140 as well as external side wall portions of the annular recesses 168,170 defined within the external peripheral surface portions of the tubular fittings 154,156. The lower shank portion 176 of the headed retaining pin 172 is smooth for engaging the annular recesses 168,170 of the tubular fittings 154,156, while the upper shank portion 178 of the headed retaining pin 172 is externally threaded so as to be threadedly engaged within the internally threaded bore 174.

Having described the structure of the new and improved hot melt adhesive material dispensing system 110, constructed in accordance with the principles and teachings of the present invention, and comprising the new and improved solenoid control valve assembly 112 and the new and improved adhesive control module assembly 114, the operation of the new and improved solenoid control valve assembly 112, in conjunction with the new and improved adhesive control module assembly 114, will now be briefly described. By means of the aforenoted structure comprising the tubular fittings 154,156 and the mounting of the same upon the adhesive control module assembly 114 by means of the retaining pin 172, a solenoid control valve assembly 112 may be quickly, easily, and directly mounted upon the adhesive control module assembly 114, the solenoid control valve assembly 112 may also be quickly and easily removed from the adhesive control module assembly 114, and the solenoid control valve assembly 112 may also be quickly and easily replaced with another solenoid control valve assembly 112 as may be necessary. In addition, the tubular fittings 154,156 have the fluid passageways 160,162 defined therewithin which are fluidically connected in a substantially linear manner at their upstream end portions to the inlet supply and outlet exhaust control air passages 124, 126 defined within the solenoid control valve assembly 112, as well as being fluidically connected at their downstream end portions to the air passageways 142,144 defined within the side wall portion 146 of the cylinder 140. In this manner, relatively short linear fluid passageways are defined within the solenoid control valve assembly 112 and the adhesive control module assembly 114 whereby actuation, response, and cycling times of the nozzle dispensing valve assembly 130, as a result of the incoming control air acting thereon as determined by means of the solenoid control valve 118, can be significantly reduced.

More particularly, in connection with the actuation of the nozzle dispensing valve assembly 130, when the nozzle dispensing valve member 134 of the nozzle dispensing valve assembly 130 is adapted to be disposed at its CLOSED, seated position with respect to its valve seat, not shown, incoming control air, entering inlet supply control air passage 124, will be directed by means of the solenoid control valve 118 toward the upper tubular fitting 154 and the fluid passageway 160 defined therewithin such that the incoming control air can, in turn, be conducted, by means of air passageway 142 defined within cylinder 140, into the upper part of the air control chamber 138 disposed above piston 136, thereby forcing the nozzle dispensing valve member 134 vertically downwardly to its CLOSED position upon its valve seat, not shown. At the same time, air will be conducted outwardly from the lower part of the air control chamber 138 disposed beneath the piston 136 so as to be exhausted through means of air passageway 144 defined within cylinder 140, fluid passageway 162 defined within tubular fitting 156, and, as determined by means of the solenoid control valve 118, outwardly through the outlet exhaust control air passage 126. Conversely, when the nozzle dispensing valve member 134 of the nozzle dispensing valve assembly 130 is adapted to be disposed at its OPENED, unseated position with respect to its valve seat, not shown, incoming control air, entering inlet supply control air passage 124, will be directed by means of the solenoid control valve 118 toward the lower tubular fitting 156 and the fluid passageway 162 defined therewithin such that the incoming control air can, in turn, be conducted, by means of air passageway 144 defined within cylinder 140, into the lower part of the air control chamber 138 disposed beneath piston 136, thereby forcing the nozzle dispensing valve member 134 vertically upwardly to its OPENED position away from its valve seat, not shown. At the same time, air will be conducted outwardly from the upper part of the air control chamber 138 disposed above the piston 136 so as to be exhausted into air passageway 142 defined within cylinder 140, fluid passageway 160 defined within tubular fitting 154, and, as determined by means of the solenoid control valve 118, outwardly through the outlet exhaust control air passage 126.

Thus, it may be seen that in accordance with the principles and teachings of the present invention, a new and improved hot melt adhesive material dispensing system comprising a new and improved solenoid control valve assembly for use in connection with a new and improved adhesive control module assembly, has been disclosed wherein the new and improved solenoid control valve assembly is able to be directly mounted upon the adhesive control module assembly so as to eliminate the connecting tubes between the solenoid control valve assembly and the adhesive control module assembly, and so as to, in addition, effectively comprise substantially short linear fluid flow paths between the solenoid control valve assembly and the adhesive control module assembly in order to thereby minimize the lengths of the control air flow paths extending between the solenoid control valve assembly and the adhesive control module assembly, thereby significantly reducing actuation, response, and cycling times of the nozzle dispensing valve member disposed within the adhesive control module assembly. Still further, the fittings of the solenoid control valve assembly enable the quick and easy removal, and replacement, of the solenoid control valve assembly from and upon the adhesive control module assembly.

Obviously, many variations and modifications of the present invention are possible in light of the above teachings. It is therefore to be understood that within the scope of the appended claims, the present invention may be practiced otherwise than as specifically described herein.

What is claimed as new and desired to be protected by Letters Patent of the United States of America, is:

1. A fluid dispensing system comprising:
   a solenoid control valve assembly housing;
   a solenoid control valve member disposed within said solenoid control valve assembly housing and movable between first and second positions;
   an electrical connector mounted upon a first side wall portion of said solenoid control valve assembly housing for providing electricity to said solenoid control valve member;
   a pair of inlet supply and outlet exhaust passages defined within said first side wall portion of said solenoid control valve assembly housing and fluidically connected to said solenoid control valve member so as to supply and exhaust control air to and from said solenoid control valve member;
   a fluid control module assembly having a dispensing valve assembly disposed therein, wherein said dispensing valve assembly comprises a dispensing valve member and a valve stem, and wherein said fluid control module assembly also has a control piston disposed therein which is coaxially mounted upon said valve stem and which is disposed within an air control chamber also defined within said fluid control module assembly;
   a pair of bores defined within said fluid control module assembly fluidically connected to said air control chamber within which said control piston is disposed; and
   a pair of fittings projecting outwardly from a second side wall portion of said solenoid control valve assembly housing, which is disposed opposite said first side wall portion of said solenoid control valve assembly housing upon which said electrical connector is mounted and within which said pair of inlet supply and outlet exhaust passages are defined, wherein said pair of fittings respectively define first and second fluid passages which have upstream end portions fluidically connected to said solenoid control valve member and said inlet supply and outlet exhaust passages, while downstream end portions of said pair of fittings are adapted to be mated within said fluid control module assembly so as to be fluidically connected to said pair of bores defined within said fluid control module assembly, which has said control piston and said dispensing valve assembly disposed therein, such that when said solenoid control valve member is disposed at said first position, said inlet supply passage is fluidically connected to said first fluid passage of said pair of fittings and to a first one of said pair of bores defined within said fluid control module assembly such that said control air is supplied to said air control chamber in order to move both said control piston and said dispensing valve member in a first direction so as to permit the dispensing of a fluid, and said second fluid passage of said pair of fittings is fluidically connected to said outlet exhaust passage, while when said solenoid control valve member is disposed at said second position, said inlet supply passage is fluidically connected to said second fluid passage of said pair of fittings and to a second one of said pair of bores defined within said fluid control module assembly such that said control air is supplied to said air control chamber in order to move both said control piston and said dispensing valve member in a second direction so as to prevent the dispensing of a fluid, and said first fluid passage of said pair of fittings is fluidically connected to said outlet exhaust passage.

2. The fluid dispensing system as set forth in claim 1, wherein:
   each one of said pair of fittings, projecting outwardly from said second side wall portion of said solenoid control valve assembly housing, has an annular recess defined within an external peripheral surface portion thereof; and
   a retaining pin is disposed within said fluid control module assembly for disposition within said annular recesses defined within said external peripheral surface portions of each one of said pair of fittings so as to removably mount said solenoid control valve assembly upon said fluid control module assembly.

3. The fluid dispensing system as set forth in claim 2, further comprising:
   a bore defined within said fluid control module assembly which intersects said pair of bores, defined within said fluid control module assembly within which said pair of fittings are disposed, such that said retaining pin can be accommodated within said bore defined within said fluid control module assembly and thereby engage said annular recesses defined within said external peripheral surface portions of each one of said pair of fittings so as to fixedly retain each one of said pair of fittings within said fluid control module assembly.

4. The fluid dispensing system as set forth in claim 3, wherein:
- said bore defined within said fluid control module assembly for accommodating said retaining pin is internally threaded; and
- said retaining pin has first shank portions which have smooth external surface portions for engaging each one of said annular recesses defined within said external peripheral surface portions of each one of said pair of fittings, and a second externally threaded portion for threadedly engaging said internally threaded bore defined within said fluid control module assembly.

5. A hot melt adhesive dispensing system comprising:
- a solenoid control valve assembly housing;
- a solenoid control valve member disposed within said solenoid control valve assembly housing and movable between first and second positions;
- an electrical connector mounted upon a first side wall portion of said solenoid control valve assembly housing for providing electricity to said solenoid control valve member;
- a pair of inlet supply and outlet exhaust passages defined within said first side wall portion of said solenoid control valve assembly housing and fluidically connected to said solenoid control valve member so as to supply and exhaust control air to and from said solenoid control valve member;
- a hot melt adhesive control module assembly having a dispensing valve assembly disposed therein, wherein said dispensing valve assembly comprises a dispensing valve member and a valve stem, and wherein said hot melt adhesive control module assembly also has a control piston disposed therein which is coaxially mounted upon said valve stem and which is disposed within an air control chamber also defined within said fluid control module assembly;
- a pair of bores defined within said hot melt adhesive control module assembly fluidically connected to said air control chamber within which said control piston is disposed; and
- a pair of fittings projecting outwardly from a second side wall portion of said solenoid control valve assembly housing, which is disposed opposite said first side wall portion of said solenoid control valve assembly housing upon which said electrical connector is mounted and within which said pair of inlet supply and outlet exhaust passages are defined, wherein said pair of fittings respectively define first and second fluid passages which have upstream end portions fluidically connected to said solenoid control valve member and said inlet supply and outlet exhaust passages, while downstream end portions of said pair of fittings are adapted to be mated within said hot melt adhesive control module assembly so as to be fluidically connected to said pair of bores defined within said hot melt adhesive control module assembly, which has said control piston and said dispensing valve assembly disposed therein, such that when said solenoid control valve member is disposed at said first position, said inlet supply passage is fluidically connected to said first fluid passage of said pair of fittings and to a first one of said pair of bores defined within said hot melt adhesive control module assembly such that said control air is supplied to said air control chamber in order to move both said control piston and said dispensing valve member in a first direction so as to permit the dispensing of a hot melt adhesive, and said second fluid passage of said pair of fittings is fluidically connected to said outlet exhaust passage, while when said solenoid control valve member is disposed at said second position, said inlet supply passage is fluidically connected to said second fluid passage of said pair of fittings and to a second one of said pair of bores defined within said hot melt adhesive control module assembly such that said control air is supplied to said air control chamber in order to move both said control piston and said dispensing valve member in a second direction so as to prevent the dispensing of a hot melt adhesive, and said first fluid passage of said pair of fittings is fluidically connected to said outlet exhaust passage.

6. The hot melt adhesive dispensing system as set forth in claim 5, wherein:
- each one of said pair of fittings, projecting outwardly from said second side wall portion of said solenoid control valve assembly housing, has an annular recess defined within an external peripheral surface portion thereof; and
- a retaining pin is disposed within said hot melt adhesive control module assembly for disposition within said annular recesses defined within said external peripheral surface portions of each one of said pair of fittings so as to removably mount said solenoid control valve assembly upon said hot melt adhesive control module assembly.

7. The hot melt adhesive dispensing system as set forth in claim 6, further comprising:
- a bore defined within said hot melt adhesive control module assembly which intersects said pair of bores, defined within said hot melt adhesive control module assembly within which said pair of fittings are disposed, such that said retaining pin can be accommodated within said bore defined within said hot melt adhesive control module assembly and thereby engage said annular recesses defined within said external peripheral surface portions of each one of said pair of fittings so as to fixedly retain each one of said pair of fittings within said hot melt adhesive control module assembly.

8. The hot melt adhesive dispensing system as set forth in claim 6, wherein:
- said bore defined within said hot melt adhesive control module assembly for accommodating said retaining pin is internally threaded; and
- said retaining pin has first shank portions which have smooth external surface portions for engaging each one of said annular recesses defined within said external peripheral surface portions of each one of said pair of fittings, and a second externally threaded portion for threadedly engaging said internally threaded bore defined within said hot melt adhesive control module assembly.

* * * * *